US009596650B2

(12) United States Patent
Bradley

(10) Patent No.: US 9,596,650 B2
(45) Date of Patent: Mar. 14, 2017

(54) RADIO WAKE-UP SYSTEM WITH MULTI-MODE OPERATION

(71) Applicant: Microsemi Corporation, Aliso Viejo, CA (US)

(72) Inventor: Peter Bradley, Coogee (AU)

(73) Assignee: Microsemi Corporation, Aliso Viejo, CA (US)

( * ) Notice: Subject to any disclaimer, the term of this patent is extended or adjusted under 35 U.S.C. 154(b) by 121 days.

(21) Appl. No.: 14/482,527

(22) Filed: Sep. 10, 2014

(65) Prior Publication Data
US 2015/0071150 A1 Mar. 12, 2015

Related U.S. Application Data

(60) Provisional application No. 61/876,428, filed on Sep. 11, 2013.

(51) Int. Cl.
*G08C 17/00* (2006.01)
*H04W 52/02* (2009.01)
(52) U.S. Cl.
CPC ... *H04W 52/0216* (2013.01); *H04W 52/0229* (2013.01)
(58) Field of Classification Search
None
See application file for complete search history.

(56) References Cited

U.S. PATENT DOCUMENTS

| 2006/0229053 A1* | 10/2006 | Sivard | A61N 1/37223 455/343.2 |
| 2007/0183355 A1* | 8/2007 | Kuchibhotla | H04W 52/0245 370/318 |
| 2008/0061943 A1* | 3/2008 | Wu | G06K 7/0008 340/10.33 |
| 2010/0312188 A1* | 12/2010 | Robertson | A61B 5/0006 604/156 |
| 2011/0176503 A1* | 7/2011 | Patel | H04W 36/14 370/329 |
| 2011/0260923 A1* | 10/2011 | Liao | G01S 11/06 342/458 |

* cited by examiner

*Primary Examiner* — Otis L Thompson, Jr.
(74) *Attorney, Agent, or Firm* — Laubscher, Spendlove & Laubscher, P.C.

(57) ABSTRACT

In a method of establishing communication between a primary node and secondary nodes over communications channels, the secondary nodes are placed in a sleep state in the absence of active communications and are responsive to a wake-up message transmitted over the one or more communications channels from the primary node to enter a wake-up state. A wake-up message is sent from an instigator at the primary node to a receptor at a said secondary node. The communications channels with the receptor at said secondary node are periodically sniffed for a valid wake-up message. In response to reception of a valid wake-up message the receptor places the secondary node in the wake-up state. The instigator and receptor employ a selected operational mode being defined by the timing of the wake-up message and sniff pattern at the receptor. The selected operational mode is changed to suit different channel conditions.

22 Claims, 12 Drawing Sheets

RADIO WAKE-UP SYSTEM WITH MULTI-MODE OPERATION

CROSS REFERENCE TO RELATED APPLICATION

This application claims the benefit under 35 USC 119 (e) of U.S. provisional application No. 61/876,428 filed Sep. 11, 2013, the contents of which are herein incorporated by reference.

FIELD OF THE INVENTION

This invention relates to the field of radio transmission, and in particular to a method of placing a communications node in a wake-up state in response to a wake-up signal received from a remote instigator.

BACKGROUND OF THE INVENTION

In many communication systems where power is at a premium, such as low-power or battery-powered systems, it is common practice to place the communication nodes in a sleep mode wherein most of the circuits are inactive. In order to establish communications, wake-up radios are employed. A wake-up request is sent from a remote instigator to a wake-up request receptor of the wake-up radio located at the local receiver. The receptor validates the wake-up request by checking that it meets certain predetermined criteria, and in response to a valid wake-up request activates the local receiver so that it can establish communication with the remote transmitter. Typically, two-way transmission is established in which case of course the node will be a transceiver, i.e. including a transmitter.

Wake-up radios are especially useful in communication systems where a low power node is required to start quickly on receipt of an appropriate wake-up signal transmitted from a hub. The initiator of a communication session may be a human or machine user who requires wireless access to the low power node. The expected scheduling of the communication session may be unknown in many applications. Such asynchronous systems that require timely access may use either (i) continuously powered wake-up radios that listen for an incoming signal or (ii) periodically powered wake-up radios that may periodically listen or "sniff" for a wake-up signal.

Continuously powered wake-up radios have a fast response to a request for a communication session but at the expense of high power consumption or possibly poorer performance in lower power consumption configurations. The preferred option in low power applications is to use the periodic sniffing technique in which the node is in a very low power sleep mode with a timer that periodically starts the wake-up radio, which then listens or "sniffs" for a wake-up transmission from the hub. If a valid wake-up signal is detected then the wake-up radio may instruct the remainder of the node to startup and engage in a full communication session. The time between sniffs is set to satisfy the application's minimum latency requirements.

A wake-up operating system comprises two types of entity; a wake-up instigator and a wake-up receptor.

The wake-up instigator is the device that transmits the wake-up request whilst the wake-up receptor is the device receiving the wake-up request. There may exist more than one wake-up receptor for a given wake-up request. A wake-up receptor is typically part of a battery powered device or secondary node with low power operating constraints that may perform sensing or control functions as part of the application of the wireless system. A wake-up instigator is typically a hub (or primary node) that connects to remote secondary nodes within a wireless network and often has connectivity to the Internet to facilitate the flow of information and control of the wireless network to users.

SUMMARY OF THE INVENTION

According to the present invention there is provided a method of establishing communication between a primary node and one or more secondary nodes over one or more communications channels, wherein the secondary nodes are placed in a sleep state in the absence of active communications and are responsive to a wake-up message transmitted over the one or more communications channels from the primary node to enter a wake-up state to permit the establishment of active communications, the method comprising sending a wake-up message from an instigator at the primary node to a receptor at a said secondary node; periodically sniffing said one or more communications channels with the receptor at said secondary node for a valid wake-up message; in response to reception of a valid wake-up message said receptor placing said secondary node in the wake-up state; said instigator and receptor employing a selected one of a plurality of operational modes, said operational modes being defined by the timing of the wake-up message from the instigator and sniff pattern at the receptor; and changing said selected operational mode to suit different channel conditions.

The wake-up messages are sent by the wake-up instigator, which co-operates with the receptor in a common operational mode. The instigator may send the wake-up message continuously or periodically. In order to conserve power the receptor listens or "sniffs" for brief periods for a valid wake-up message. The operational modes relate to the timing of the sniffs or sniff patterns and the pattern used by the instigator to transmit the wake-up message (continuous or periodic). It will be understood in this context that the term periodic does not imply regular intervals between the sniffs or wake-up messages and includes irregular intervals with variable timing.

The channel conditions that determine the operational mode could be the degree of congestion determined, for example, by the number of active nodes, or could be channel quality determined by signal-to-noise ratio or bit error rate. Alternatively, the channel conditions could relate to the time of day. For example, a different operational mode may be selected at night.

The secondary nodes are typically transceivers capable of two-way duplex transmission, or the transmission could be just one way from the primary node, depending on the application. They could be arranged as a single pair or in a hub and spoke (also called a star) arrangement, such as is found in a Wi-Fi network, for example. It will also be understood that any node capable of waking up another node can be considered a primary node.

Embodiments of the invention thus provide a method of varying the timing of sniffs in the receptor and the transmission of wake-ups attempts in the instigator while minimizing the sniffing requirements and current consumption of the receptor. By controlling the timing of sniffs, dependent on the desired characteristics of the wake-up transmission, embodiments of the invention minimize sniffing times (and thus current consumption) whilst minimizing latency (time from wake-up request to response).

In another aspect the present invention provides a communication system wherein communications are established between a primary node and one or more secondary nodes over one or more communications channels, wherein the secondary nodes are placed in a sleep state in the absence of active communications and are responsive to a wake-up message transmitted over the one or more communications channels from the primary node to enter a wake-up state to permit the establishment of active communications, the system comprising an instigator for transmitting on demand a wake-up message over the one more communication channels; and a receptor configured to periodically sniff said one or more communications channels at said secondary node for a valid wake-up message; said receptor comprising a wake-up signal generator for generating a wake-up signal to place the secondary node in the wake-up state in response to reception of a valid wake-up message; and a controller configured to employ a selected one of a plurality of operational modes, said operational modes being defined by the timing of the wake-up message and sniff pattern at the receptor, said controller further being configured to change said selected operational mode at the receptor to suit different channel conditions.

It will also be understood that the instigator and receptor can be integrated directly into the nodes so as to form an integral part thereof or they may be separate entities.

In yet another aspect the invention provides a receptor for use in a communication system wherein communications are established between a primary node and one or more secondary nodes over one or more communications channels, wherein the secondary nodes are placed in a sleep state in the absence of active communications and are responsive to a wake-up message transmitted over the one or more communications channels from the primary node to enter a wake-up state to permit the establishment of active communications, the receptor comprising a wake-up receiver for receiving a wake-up message from an instigator at the primary node; a controller for periodically activating the wake-up receiver to sniff said one or more communications channels with the receptor to listen for a wake-up message; in response to reception of a valid wake-up message said receptor placing said secondary node in the wake-up state; said controller employing a selected one of a plurality of operational modes, said operational modes being defined by the timing of the wake-up message and sniff pattern at the receptor, and said controller being configured to change said selected operational mode to suit different channel conditions.

In a still further aspect the invention provides an instigator for use in a communication system wherein communications are established between a primary node and one or more secondary nodes over one or more communications channels, wherein the secondary nodes are placed in a sleep state in the absence of active communications and are responsive to a wake-up message transmitted over the one or more communications channels from the primary node to enter a wake-up state to permit the establishment of active communications, the instigator comprising a transmitter controller for generating a wake-up message; a transmitter for transmitting for the wake-up message node to a receptor at a said secondary node; a transmission monitor for monitoring the quality of the one more communications channels; and a mode controller for selecting one of a plurality of operational modes, said operational modes being defined by the timing of the wake-up message and sniff pattern at the receptor, and said mode controller being configured to change said selected operational mode to suit different channel conditions.

BRIEF DESCRIPTION OF THE DRAWINGS

The invention will now be described in more detail, by way of example only, with reference to the accompanying drawings, in which.

DETAILED DESCRIPTION OF THE INVENTION

Embodiments of the invention include a controller in the receptor, which has several operational modes each optimized for different expected instigator transmissions, which may be based on channel conditions. Each operational mode modifies the timing of the sniffs for optimal system performance (minimum latency, probability of missed wake-up etc.) given the expected instigator transmissions.

The instigator monitors communication activity on the desired wake-up communication channels or channels. When the instigator determines that channel conditions have changed and a new mode is warranted then the instigator may wake-up the receptor and send a mode change signal requesting that its controller reprogram the operational mode to set operation in accordance with the new mode.

Alternatively, the receptor may monitor communications in a manner similar to the instigator and/or use information extracted from its wake-up sniffing to determine the best operational mode given the conditions.

In a further embodiment, either the instigator or the receptor may monitor communications over a lengthy period of time and determine a sequence of modes over time that the receptor should use. For example, a nighttime mode may differ from a daytime operational mode.

Figure 1:
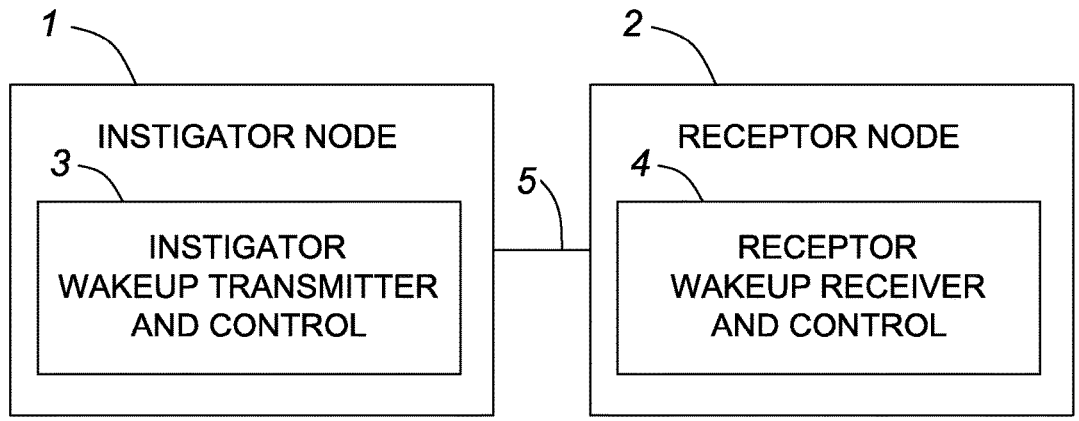
FIG. 1 is a high-level block diagram of a communications system with a wake-up facility.

A typical communication system in accordance with an embodiment of the invention is shown in FIG. 1. Instigator node 1 communicates over a communications channel 5 with receptor node 2, which defaults to the sleep state wherein it is completely off or in a state where most of the active circuits are off such that it consumes very little power. Instigator node 1 includes a wake-up transmitter and control module 3, which communicates with a wake-up receiver and control module 4 at the receptor node 2.

Figure 4:
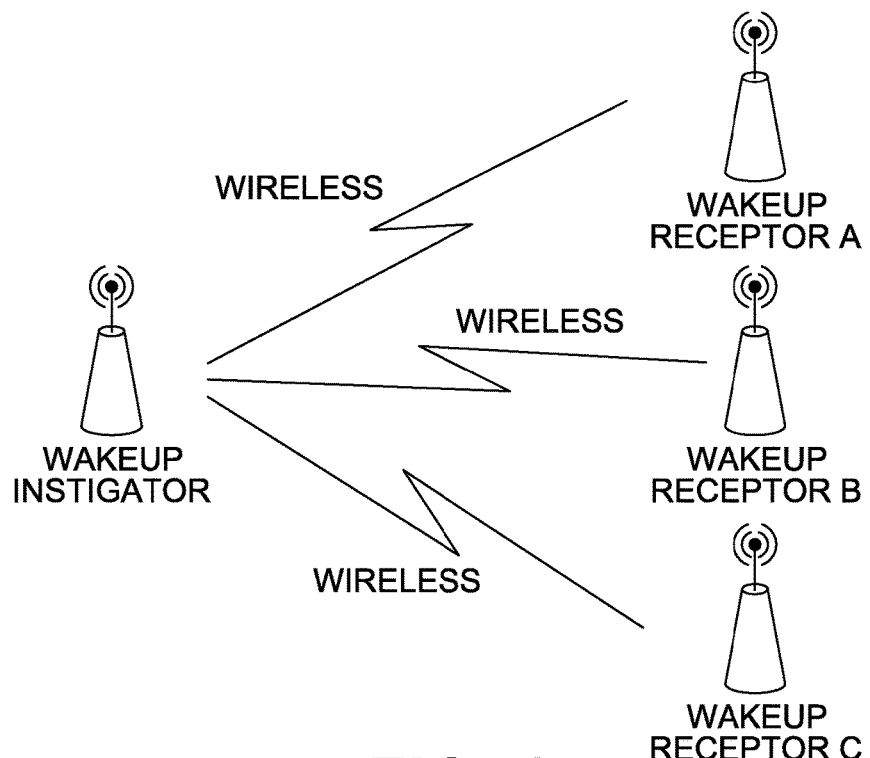
FIG. 4 illustrates a hub and spoke (star) communication system.

When node 1 wishes to communicate with node 2 while node 2 is in the sleep state, wake-up transmitter and control module 3 at instigator node 1 sends a wake-up message over communications channel 5 to wake-up receiver and control module 4 at node 2. When the wake-up receiver and control module 4 detects a valid wake-up message, it puts receptor node 2 into the wake-up state so that it can establish communication with instigator node 1. The wake-up message can be a data pattern that can be verified by the wake-up receiver and control module 4 to determine that it is a valid message. Nodes 1 and 2 may be transceivers, and may be arranged in a hub and spoke configuration as shown in FIG. 4. The instigator node 1 and receptor node 2 may contain alternative communication channels and associated transceivers that are activated by a successful wake-up transmission between the wake-up transmitter and control module 3 and the wake-up receiver and control module 4.

Figure 2:
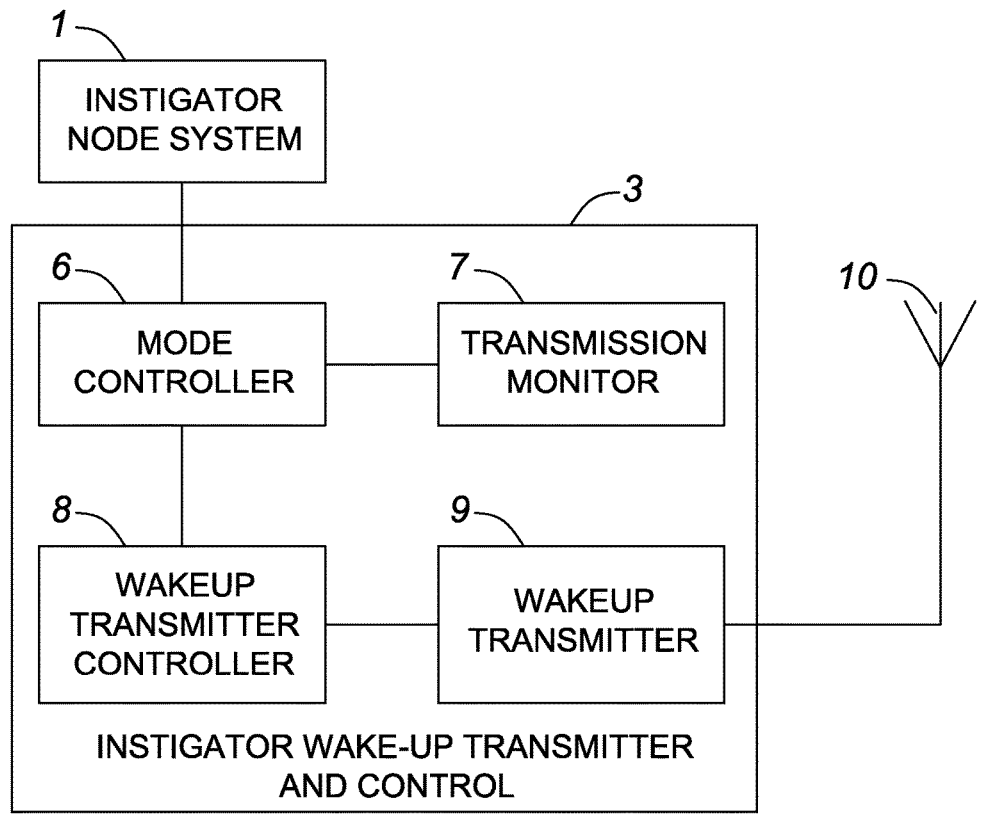
FIG. 2 is a block diagram showing more detail of a wake-up instigator.

As shown in FIG. 2, the wake-up transmitter and control module 3 at the instigator node 1 comprises a transmission monitor 7 for monitoring the quality of the communication channel, a mode controller 6 for selecting the desired operational mode of the wake-up operating system, a wake-up transmitter controller 8 for generating a wake-up message when instigator node 1 wishes to establish communication with the receptor node 2, and a wake-up transmitter 9 for transmitting the wake-up message over the communications channel 5 via antenna 10. In one embodiment, when the transmission monitor 7 determines that the channel conditions have changed by more than a certain amount, the mode controller 6 sends a mode change signal to wake-up transmitter controller 8, and wake-up transmitter controller 8 responds to the mode change signal by setting its pattern to the mode indicated by the mode change signal, and by further outputting a mode change instruction signal to the receptor wake-up receiver and control module 4.

Figure 3:
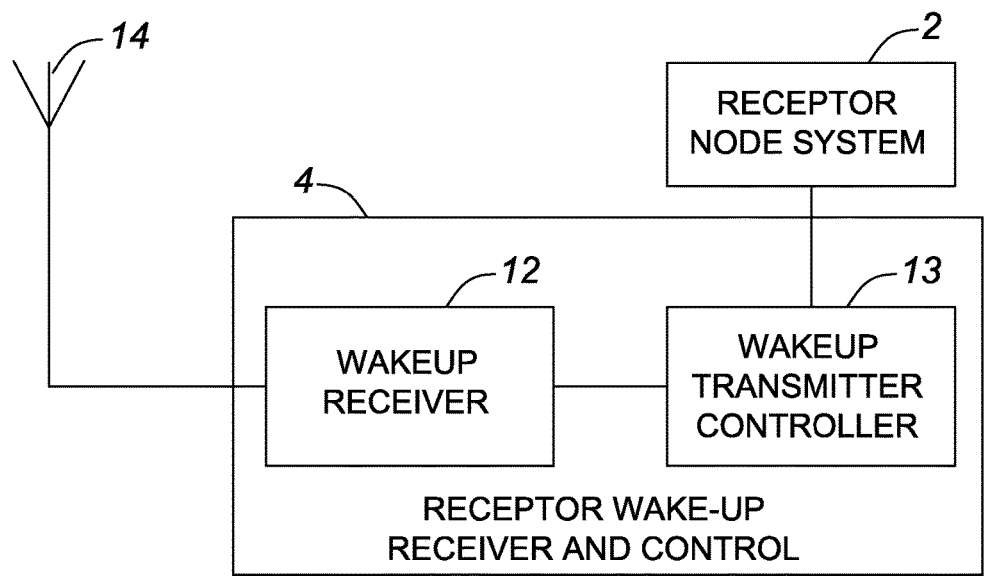
FIG. 3 is a block diagram showing more detail of a wake-up receptor.

The wake-up receiver and control module 4 at the receptor node 2 is shown in FIG. 3. The module 4 comprises a wake-up receiver 12 which receives wake-up messages from the instigator 1 via antenna 14, a wake-up receiver controller module 13 for generating a wake-up signal to wake-up the node 2, and for setting the operational mode of the wake-up receiver 12 depending on transmission conditions or commands from the instigator node 1. The wake-up receiver and control module 4 may also include a similar transmission monitor to the transmission monitor 7 in the instigator node 1, and the wake-up receiver controller module 13 may respond to a signal from the transmission monitor in the receptor to change the operational mode when the channel conditions change by a certain amount determined by predetermined criteria.

In very low power applications it is undesirable for the receptor node 2 to be on the whole time, and so the wake-up receiver and control module 4 is programmed to wake up periodically for brief periods to sniff for a valid wake-up message from the instigator node 1. If during a sniff period the wake-up up receiver and control module 4 detects a possible wake-up message, it remains in the active state to read the entirety of the wake-up message to verify that it is a valid wake-up message. A suitable scheme is described in US patent publication no. 20060229053, the contents of which are herein incorporated by reference, wherein the sniff window is extended when a partial wake-up message is detected in order to determine whether a valid wake-up message is present.

Figure 5:
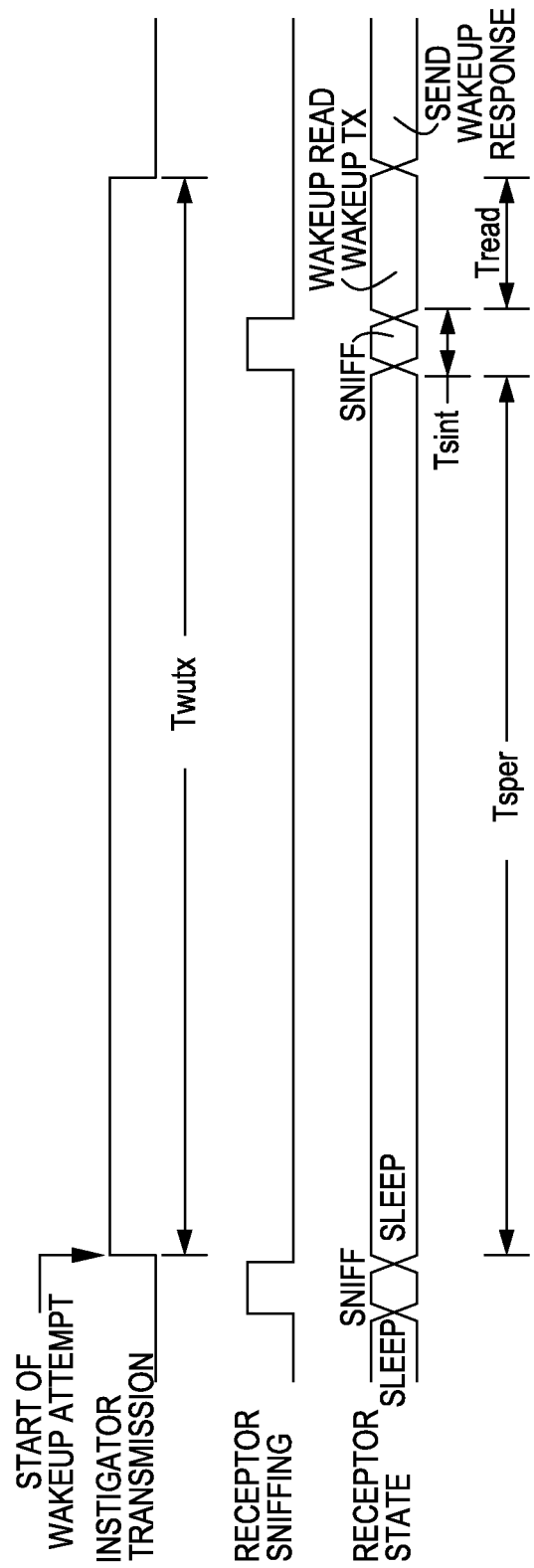
FIG. 5 is an exemplary timing diagram of a possible Instigator transmission (Continuous) message.

It will be seen with reference to FIG. 5 that to maximize the probability of the wake-up transmission from the instigator node 1 being received by the wake-up receiver and control module 4, the wake-up transmission should be at least as long as the time between receptor wake-up radio sniffs. This ensures that the next available sniff will receive the wake-up transmission even if the last sniff was just missed. Ideally therefore the instigator transmission time (Twtx) should be set as follows:

$$Twtx > Tsper + Ts + Tr$$

where Tsper=time between sniffs, Ts=sniff time, Tr=wake-up message read time. While this scheme, when used as the sole scheme, minimizes the sniffing time of the receptor, it has certain drawbacks. The instigator transmission may need to be on for a relatively long time period, which increases spectral occupancy and may affect other desired communications. For example, in the 2.45 GHz ISM band it may affect throughput of Wi-Fi communications. Additionally, the power consumption of the instigator is increased due to the long transmission time. While this is not an issue in mains-powered instigators, it becomes important in battery-powered devices. There is generally a greater average latency from requesting a wake-up to the receptor sending a wake-up response since the receptor must wait for the end of the wake-up transmission to send a response unless the wake-up response is sent on a different channel that is not interfered by the wake-up transmission.

In accordance with embodiments of the invention the timing of sniffing in the receptor and transmission of wake-up attempts by the instigator is controlled so as to minimize the sniffing requirements and current consumption of the receptor. By controlling the timing of sniffs, dependent on the desired characteristics of the wake-up transmission, embodiments of the invention minimize sniffing times and thus current consumption) while minimizing latency (time from wake-up request to response).

In accordance with exemplary embodiments of the invention, the instigator 1 and receptor 2 operate in different modes depending on transmission characteristics. The different modes, which will be described in more detail below, are summarized in the following table:

| Mode | Instigator transmission | Receptor Sniffing Mode | Comments |
|---|---|---|---|
| A | Long continuous | Periodic sniff attempts at a fixed interval given by: Tsper = Twtx − Ts − Tr (See FIG. 2) | Suitable when low channel occupancy has been measured. |
| B | Periodic Pattern with known duty cycle (i.e. on and off times (Ton and Toff)) | Periodic sniff attempts at a fixed interval, ideally given by: Tsper1(n) = n (Toff + Ton) + | Suitable when relatively low channel occupancy has been measured and control |

-continued

| Mode | Instigator transmission | Receptor Sniffing Mode | Comments |
| --- | --- | --- | --- |
| | | Toff + Ts<br>or alternatively<br>Tsper2(n) = n (Toff + Ton) + Ton − Ts<br>Where n = positive integer selected for desired latency<br>(See FIG. 3 and 4) | of the transmission timing is good. |
| C | Any pattern with duty cycle limits (minimum on time and maximum off time) | Series of trains of sniffs at a fixed interval<br>(See FIG. 5 and 6) | Suitable for moderate to high channel usage |
| D | Shorter continuous | As per mode A but with shorter interval | Suitable for short periods of time in which the likelihood of receiving a wake-up request is elevated or a lower latency is desired |

Mode A is illustrated with reference to FIG. 6. This is the most simplistic, standard operational mode suitable when channel usage is low. The relationship between the sniffing period and the wake-up transmission is given by:

$$Tsper <= Twtx - Ts - Tr$$

The latency will depend on whether the wake-up response is transmitted in the same channel or not since in the latter case it may be transmitted immediately upon receipt of a wake-up message or with minimal delay.

Assuming the wake-up response is transmitted in the same channel, the latency is fixed at Twtx since the receptor must wait until the transmission is complete before sending a wake-up acknowledgement. If the wake-up response is transmitted in a different channel then the latency will be uniformly distributed from a time as short as Ts+Tr to a time as long as Tsper+Ts+Tr with a mean of Tsper/2+Ts+Tr.

Figure 6:
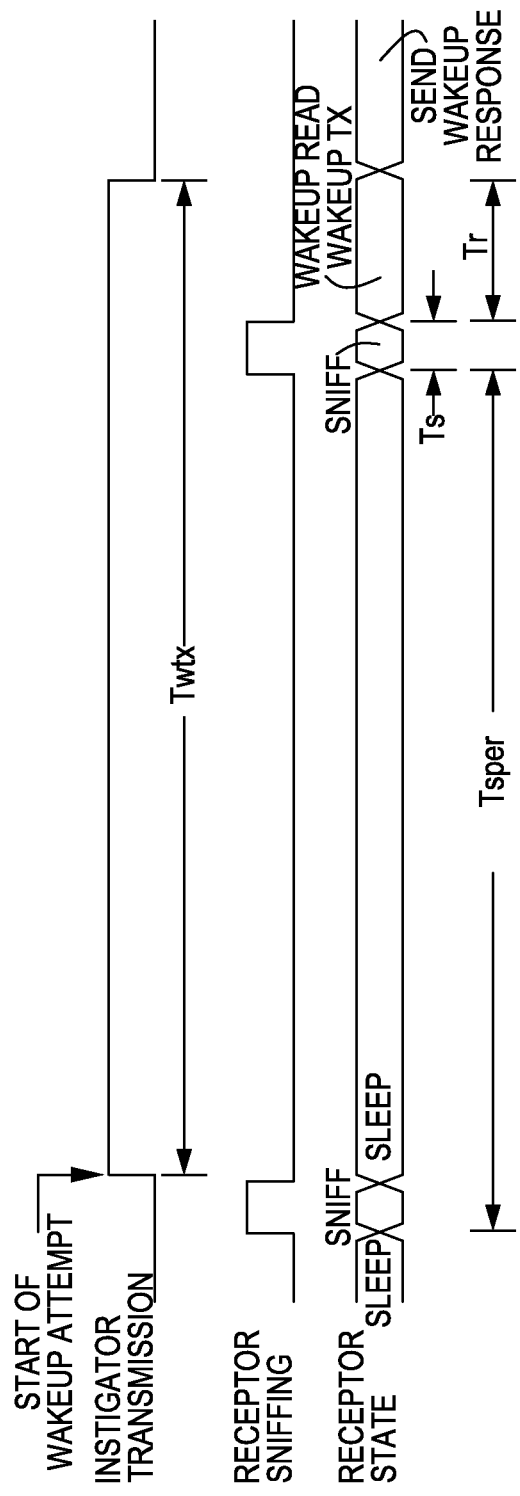
FIG. 6 is an exemplary timing diagram of for operational mode A.

While the timing diagram shown in FIG. 6 shows a successful sniff occurring towards the end of the wake-up transmission, which consists of repeated wake-up messages, it is also possible that the wake-up sniff may occur soon after the commencement of the instigator transmission or anywhere during the wake-up transmission. In cases in which the sniff occurs shortly after the transmission begins, the wake-up system will have to wait until the transmission completes before sending a wake-up response, in the event that a single channel is utilized bi-directionally. This may cost power in the wake-up system if the circuits remain powered waiting for the end of the instigator transmission.

Figure 7:
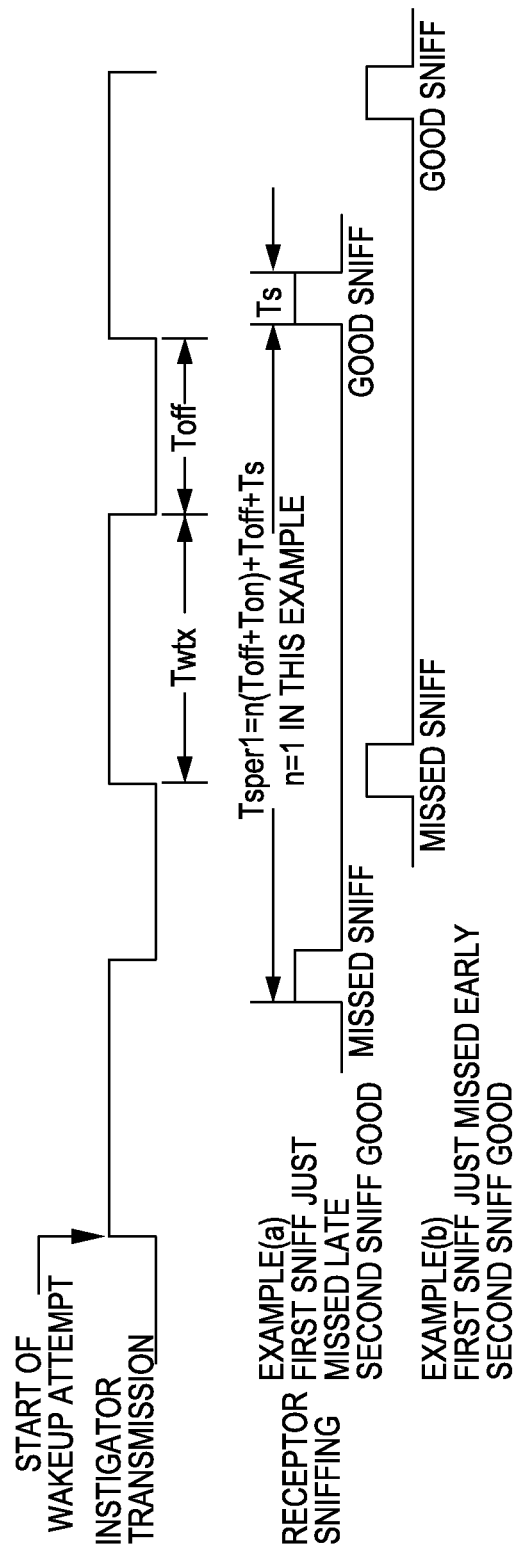
FIG. 7 is an alternative timing diagram for operational mode A.

FIG. 7 shows an embodiment that may improve the power consumption by including in part of the wake-up transmission, timing information (such as a counter) that tells the wake-up receiver how long it will be before the wake-up transmission is complete. For example, the timing information may be a counter (in units of wake-up messages) that represents the number of wake-up messages to the end of the wake-up transmission. This counter would ideally be included in each of the wake-up messages, but it could be included in only some of them. For example, if the receptor detects a valid wake-up message without a counter, it will preferably stay active until it receives the next wake-up message with a counter, whereupon it will power down until the expected end of the wake-up transmission determined from the counter information. The wake-up receiver and control module 4 calculates the time to wait before sending a wake-up response and powers down wake-up receiver 12, and any other appropriate circuitry, until this time has expired, thus saving considerable power.

Figure 8:
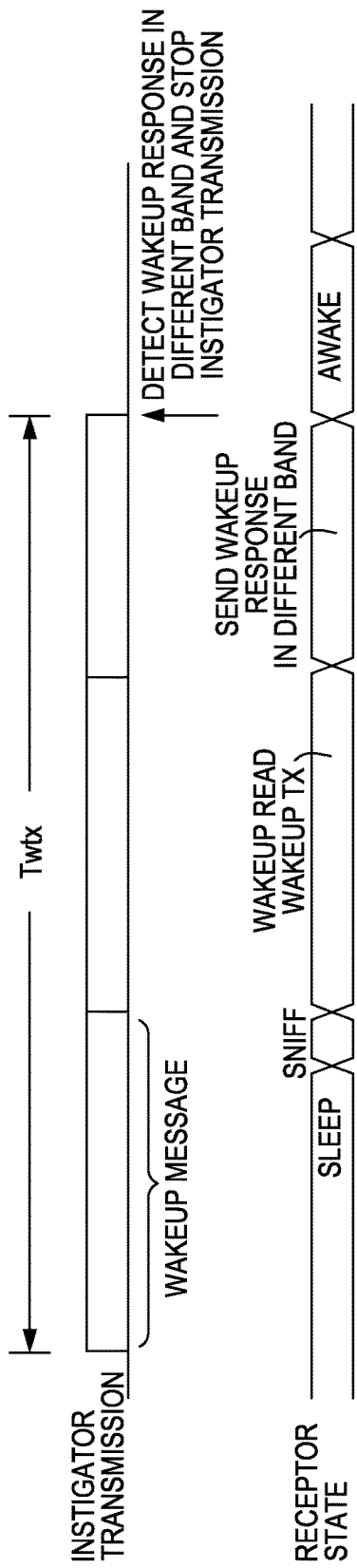
FIG. 8 is another alternative timing diagram for operational mode A.

Alternatively, in another embodiment shown in FIG. 8, the wake-up response is sent immediately in a different channel, which may be of a different band or a different RF base frequency within the transmission band and the wake-up instigator simultaneously listens for a response in this range as shown. This scheme improves the average latency at the cost of higher system complexity and also offers a potentially shorter instigator transmission time since it may be terminated when a wake-up response is received.

Figure 9:
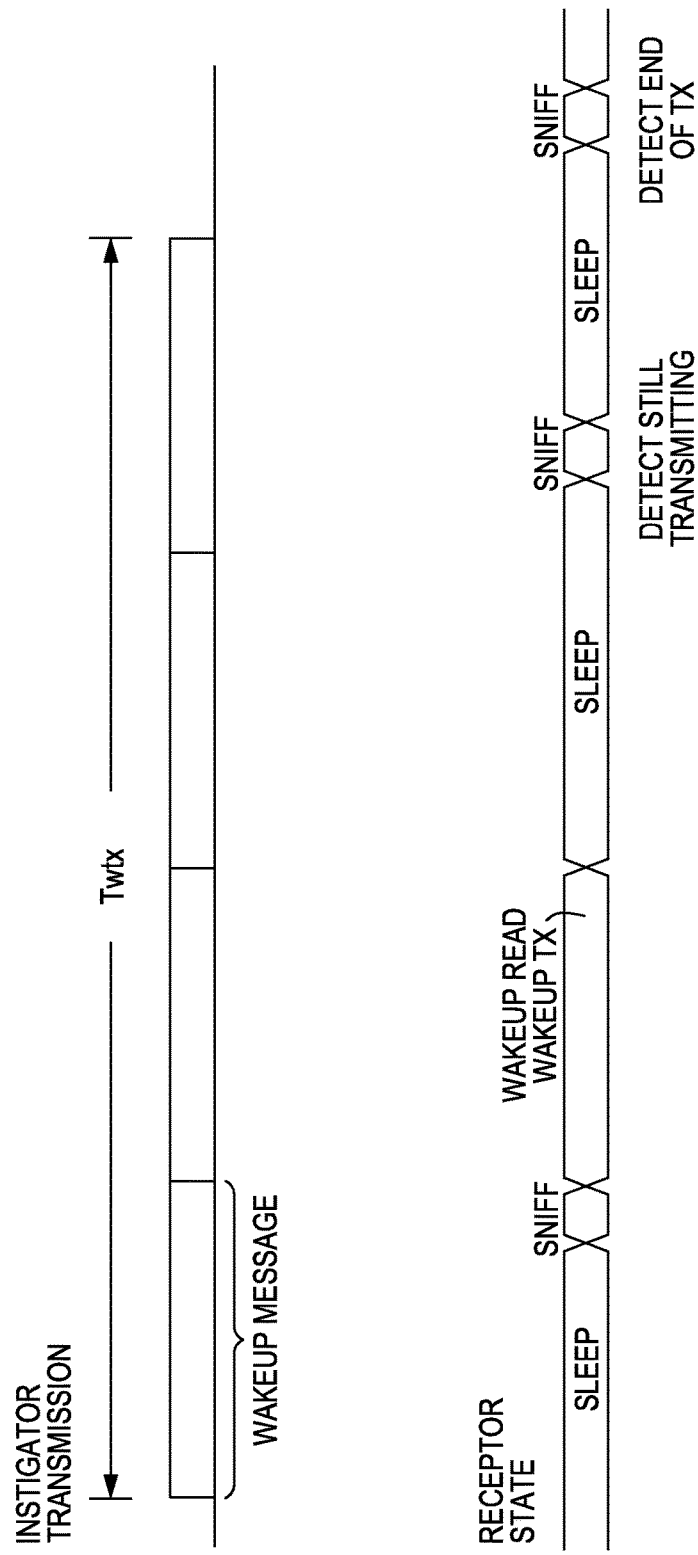
FIG. 9 is yet another alternative timing diagram for operational mode A.

In yet another embodiment shown in FIG. 9, the wake-up radio periodically sniffs for the end of the wake-up transmission with the sniffing occurring at a programmable rate adjusted according to the latency or system response requirements. This embodiment may use potentially higher power compared to the embodiment shown in FIG. 7.

The power savings embodiments are useful for mode A and any other mode wherein the duration of the wake-up transmission, which consists of repeated wake-up messages, is relatively long in relation to duration of each wake-up message.

Figure 10:
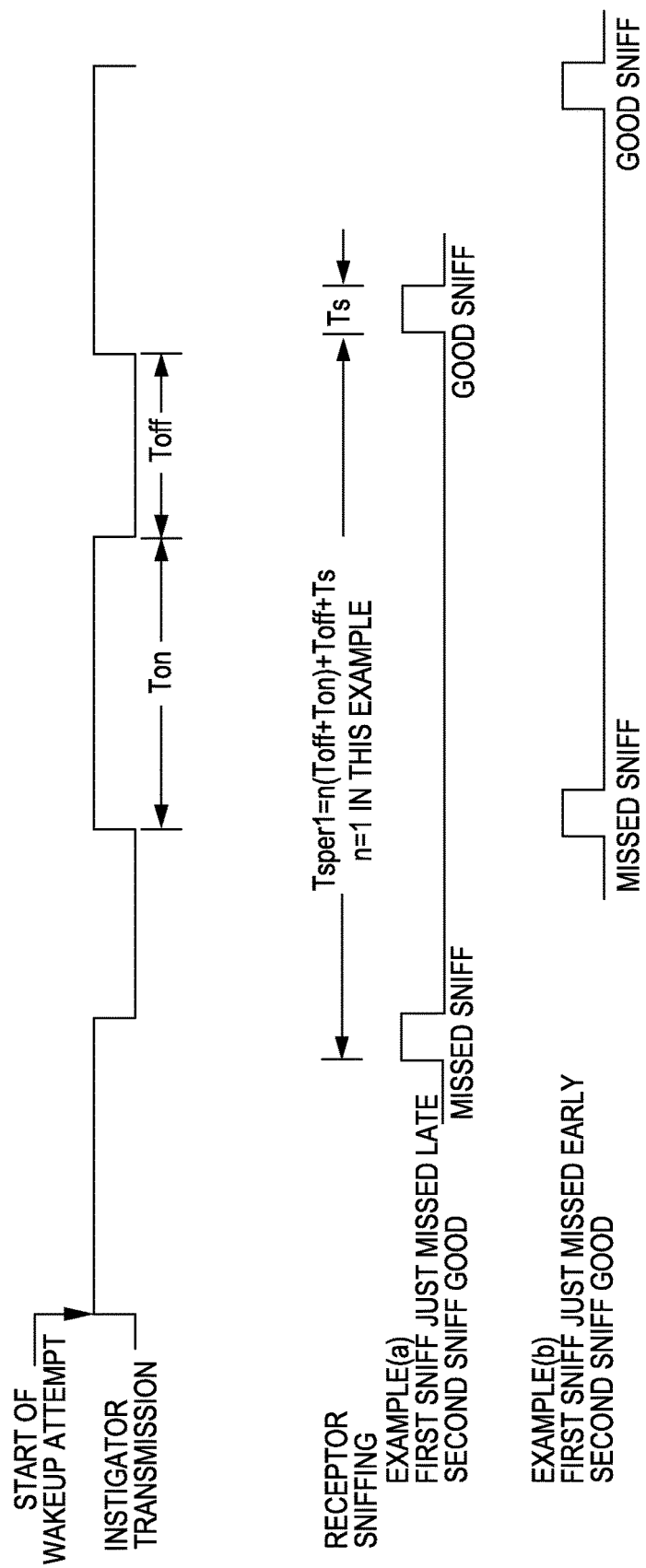
FIG. 10 is an exemplary timing diagram of for operational mode B.

Mode B is illustrated with reference to FIG. 10. If the user deems the channel occupancy or power consumption of a continuous transmission unacceptable, the instigator transmission may be duty cycled as shown in FIG. 10. This introduces the significant issue of receptor sniffs missing the instigator transmissions. One could contemplate a scheme where the instigator pattern is maintained until eventually a sniff coincides with the transmission. Sufficient randomization of time intervals in either the instigator or the receptor would be needed to ensure that sniffs were not continually coincident with off periods of the transmitter. For such a scheme and assuming an average 50% duty cycle on the transmission, the average number of sniffs required to ensure that the probability of missing a sniff is maintained below 1% is 7 sniffs. This increases to 21 sniffs for a 20% duty cycle. Such a potentially long latency may be unacceptable for many applications and systems that limit the latency are highly desirable.

In an exemplary embodiment of this invention, shown below, a much lower and fixed limit on the latency is achieved without requiring an increased sniff rate. The sniff interval is adjusted in a very defined manner according to the expected instigator transmission pattern such that if the first sniff is missed the second sniff (or one subsequent up to a set limited number of sniffs Nmin) will always be coincident with an instigator transmission.

The relationship between the sniffing period (Tsper) and the wake-up transmission is ideally given by one of two equations:

$$Tsper1(n)=n(Toff+Ton)+Toff+Ts \text{ or alternatively}$$

$$Tsper2(n)=n(Toff+Ton)+Ton-Ts$$

where n is a positive integer selected for desired latency, Toff=transmitter off time, Ton=transmitter on time, and Ts=required minimum sniff time.

The system should set the nearest value of n that satisfies the desired latency noting that frequent sniffing will improve latency at the expense of current consumption. Arranging receptor wake-up receiver and control module 4 to utilize these equations will provide a maximum latency and average latency that is better than or equal to the method proposed as Mode C described below although Mode C will be shown to be more flexible to variations in the transmitter pattern.

The minimum number of sniffs required is given by the following equation:

$$Nmin=Ceiling[(Toff+Ts)/(Ton-Ts)]+1$$

and the maximum latency is then given by:

$$\text{Max latency}=(Nmin-1)Tsper1 \text{ or alternatively}$$

$$\text{Max latency}=(Nmin-1)Tsper2$$

While the above equations for the interval between sniffs represent ideal settings for a fixed time between sniffs, there are other alternatives near these values, which will also provide good average latency for a minimum number of sniffs. These values are given by:

$$Tsper3(n,k) = (n(Toff+Ton)+Toff+Ts)/k$$
$$= Tsper1/k \text{ or alternatively}$$
$$Tsper4(n,k) = (n(Toff+Ton)+Ton-Ts)/k$$
$$= Tsper2/k$$

where k is a positive integer that is typically in the range 1 to 5. This relationship still guarantees that multiples of the sniff pulses eventually fall within the same place within the instigator transmission period and that sniff pulses will eventually be coincident with the instigator transmission. Simulations indicate that a continuous range bounded by Tsper3(n,5) to Tsper4(n+1.5) generally offers reasonable average latency for a wide range of values of Ton and Toff.

An exemplary embodiment uses settings corresponding to Tsper1(n) and Tsper2(n) to provide good performance with lowest maximum and average latency. Variation around these values will degrade performance; however, acceptable limits may be found using values in the range Tsper3(n,5) to Tsper4(n+1.5).

Mode C is illustrated with reference to FIG. 9. In some circumstances the wake-up system will only have control of the wake-up transmission "on" period but the "off" period may be influenced by listen-before-talk (LBT) requirements that require the user not to transmit if other transmissions are active. In this case, the sniffing pattern defined by the previous modes may not be ideal since the off period is variable. A sniff pattern as shown in FIG. 9 will produce a limit on the latency and minimize the number of sniffs (in a given period) required to achieve that limit. In one embodiment a train of sniffs is employed to ensure coincidence with an instigator transmission. The train comes in bursts with the interval between bursts set by the desired latency and current consumption requirements. For example, the bursts may be over 100 ms and the spacing between bursts around 1,000 ms. The receptor sniff time is defined as Ts and is the minimum required time that the receptor must listen for an instigator transmission in order to correctly detect the transmission. Therefore, it is the minimum required overlap between the instigator transmission and receptor sniff.

In order to minimize latency, the requirements for preferred operation of receptor wake-up receiver and control module 4 are that the period of sniffs in the train (Tsper2) should be set as follows:

$$Tsper2 \le Min(Ton)-Ts$$

and the number of sniffs in the train (Nt) should be set as:

$$Nt \ge Ceiling((Max(Toff)+Ts)/Tsper2)+1$$

For minimum current consumption, the preferred embodiment uses the minimum value of Nt that satisfies the above equation.

The shortest possible train of pulses is given by setting:

$$Tsper2=(Max(Toff+Ts)/(Nt-1)$$

where $$Nt=Ceiling((Max(Toff)+Ts)/(Min(Ton)-Ts))+1$$

The longest possible train of pulses is given by setting:

$$Tsper2=Min(Ton)-Ts$$

and $$Nt=Ceiling((Max(Toff)+Ts)/(Tsper2))+1$$

Figure 11:
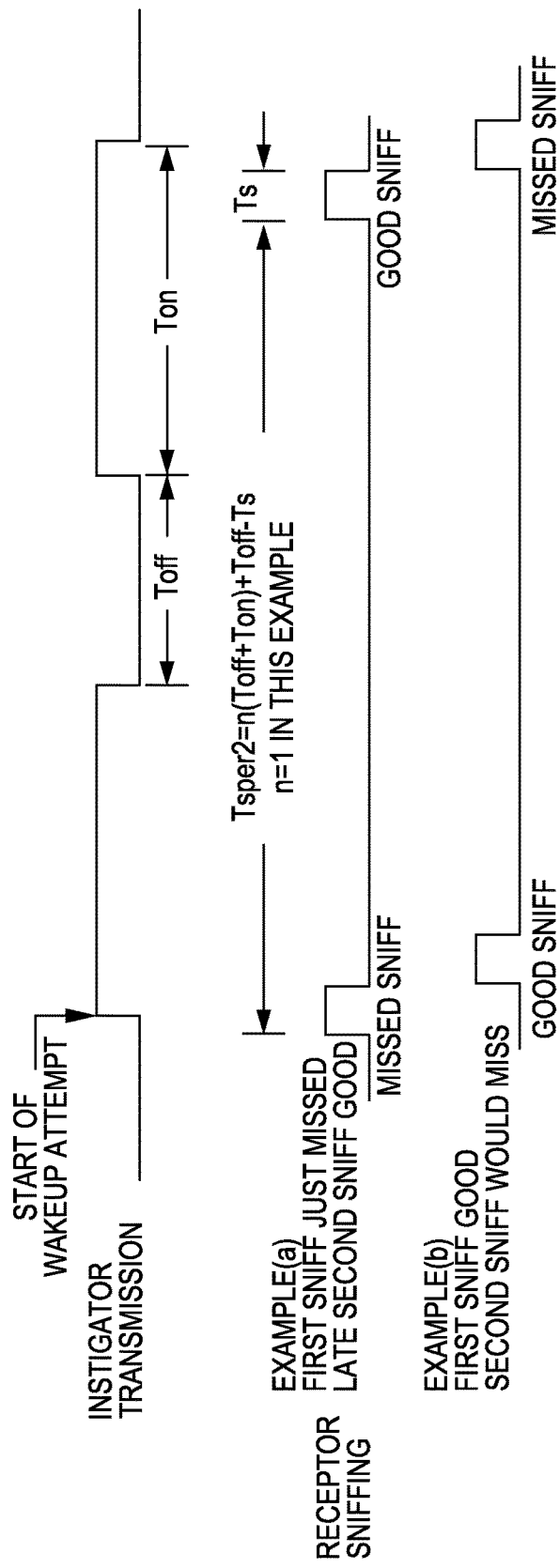
FIG. 11 is an exemplary timing diagram for an alternative pattern in mode B.
Figure 12:
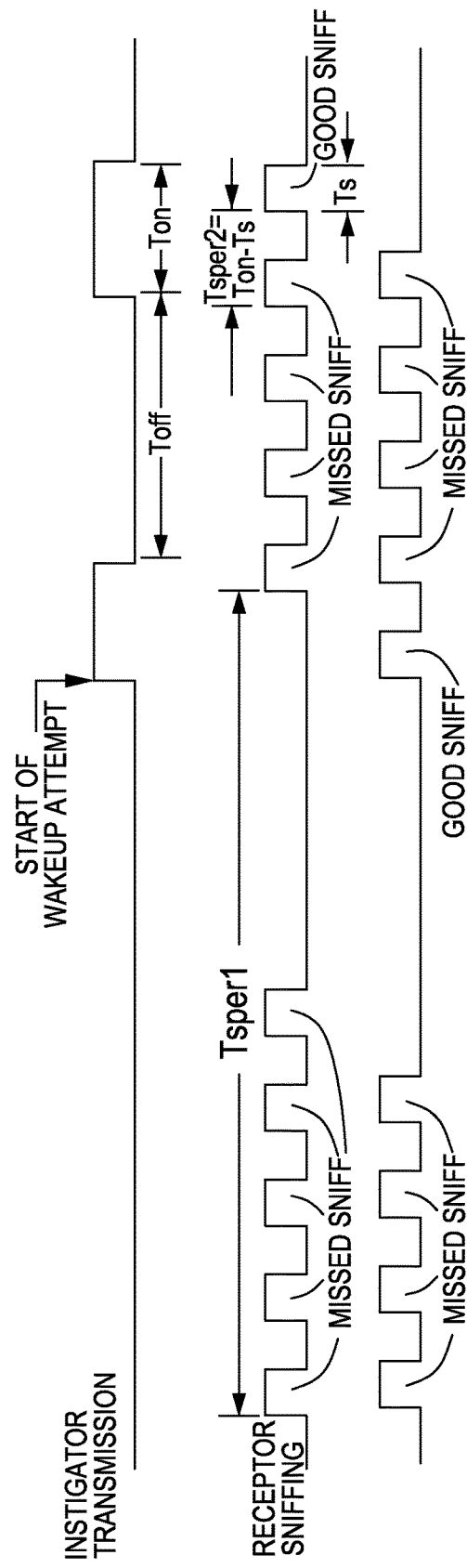
FIG. 12 is an exemplary timing diagram for operational mode C.
Figure 13:
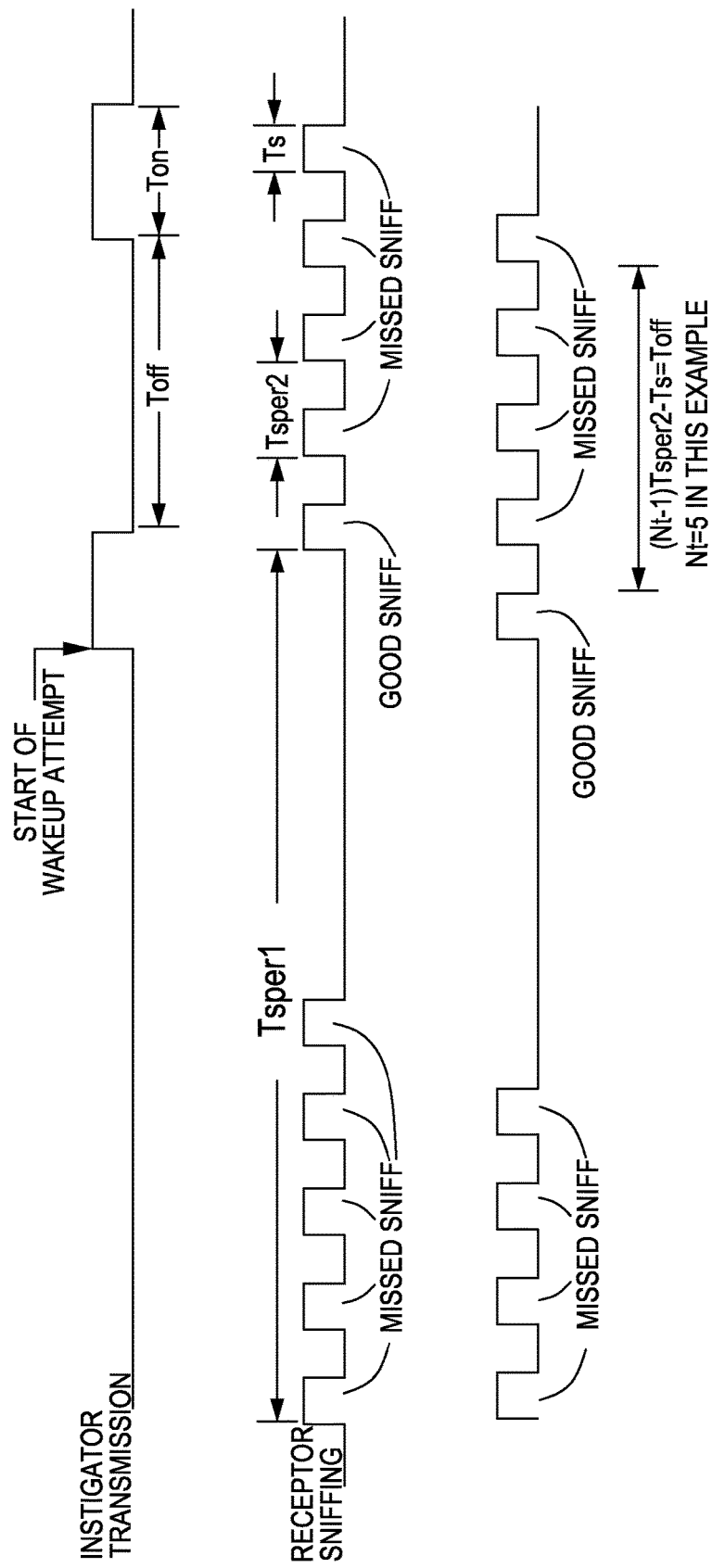
FIG. 13 is an exemplary timing diagram for operational mode D.

The distinction between these two boundary cases is illustrated in FIGS. 11 and 12.

The longer period pulse train is beneficial if some uncertainty in the Toff time of the transmitter exists. The longer train of pulses also has a performance benefit with a lower average latency and lower maximum latency over the full range of sniff periods (Tsper1). This is because the longer pulse train increases the probability of a sniff being coincident with an earlier transmission Ton time (given a random asynchronous relationship between the sniffing and wake-up message).

Conversely, the shorter period pulse train may be beneficial if some uncertainty in the Ton time exists. The shortest train of pulses also has the advantage that, if the time between pulses is sufficiently short, the system may choose to enter low power standby in between sniffs in the train rather than completely power down active circuits and enter sleep mode. This is advantageous if either the startup time or startup current of the wake-up radio is high. In these cases, lower average current may be attained by maintaining the system in a standby mode (where not all circuits are powered completely off) in between sniffs within the train.

Mode D is the same as mode A but with a reduced interval between sniffs. The idea behind this mode is that if the system has a period in which it expects an increased chance of a wake-up message then it can improve performance by increasing the sniffing rate during that period.

The ideal duty cycle of the transmitter of instigator node 1 to efficiently minimize the number of sniffs of receptor node 2 is given by solutions of the following equation:

$$(Toff+Ts)/(Ton-Ts)=k \text{ where } k \text{ is a positive integer}$$

Rewriting in terms of duty cycle (D=Ton/(Ton+Toff)) we obtain:

$$D = Ton/((1+k)(Ton-Ts))$$

If Ton>>Ts then this expression approximates to $$D = 1/(1+k)$$

That is D=1, ., ., ⅓ etc. . . . . .

Figure 14:
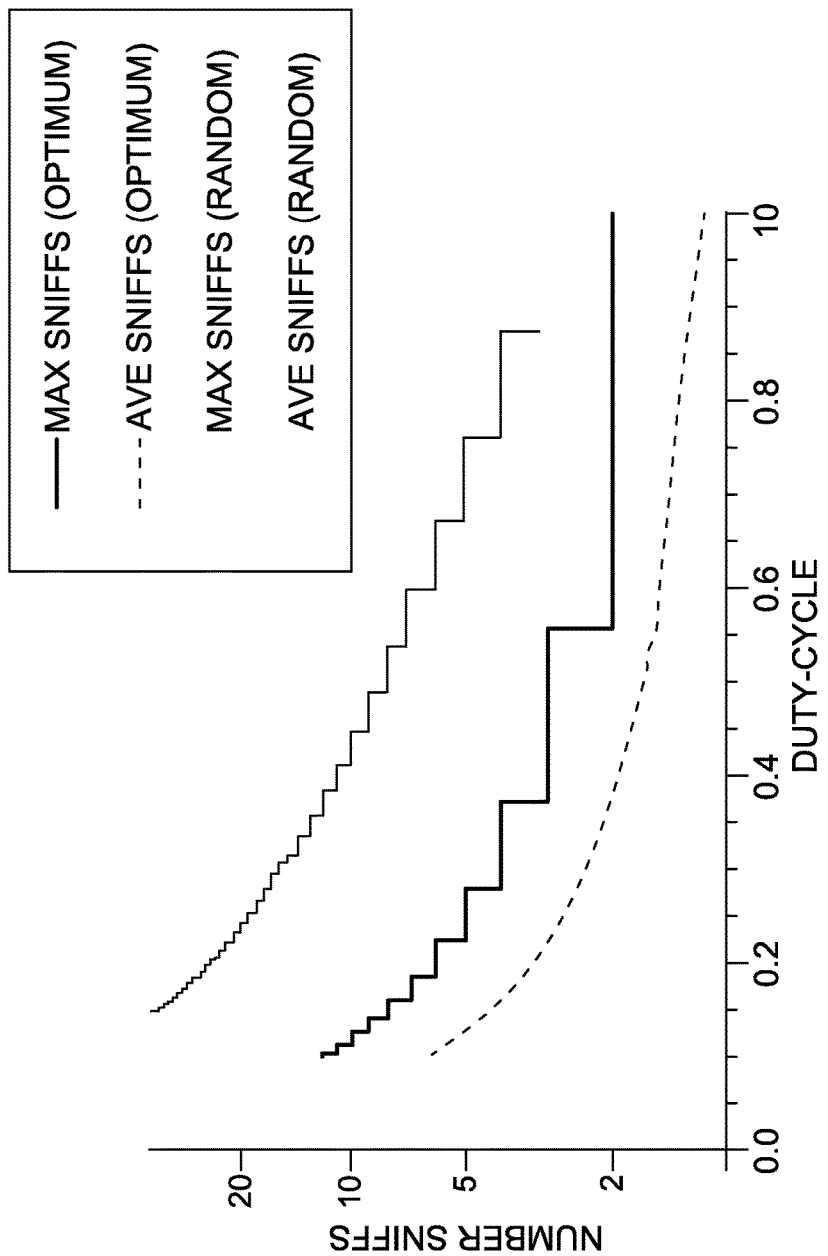
FIG. 14 is a plot showing the maximum and average number of sniffs required for a given duty cycle.

An exemplary plot of the maximum number of sniffs and average number of sniffs required for a given duty cycle is shown in FIG. 14, where the x-axis represents the duty cycle and the y-axis the average needed number of sniffs. The conditions are Ton=1, Ts=0.1. The plot shows the optimum performance attained using the methods of either mode B or C compared to a random sniffing approach which repeats enough sniffs to attain a 1% allowed miss rate. The black solid curve uses the equation for Nt presented in the Mode C section. Clearly, the optimal methods presented offer a significant improvement over the simplistic random sniffing especially for the maximum number of required sniffs (solid lines). The lower number of sniffs required at a given duty cycle saves significant power since it allows the system to set lower intervals between sniffs in order to achieve a given desired latency.

The following examples illustrate possible exemplary applications of the invention. One skilled in the art will appreciate that there are many other applications to where it can be put to advantageous use.

Example 1

An instigator and receptor node are operating in a 2.4-2.5 GHz RF environment that has variable channel usage including for example the use of common wireless communication protocols such as WiFi. The RF spectral occupancy (channel conditions) will vary due to many effects, such as variable work activities in a work environment, the time of day, such a night-time versus day-time, and the number of users.

Suppose the instigator transmission monitor 7 detects a low usage of WiFi, for example, when few users are using a WiFi network. This means that a relatively lengthy wakeup transmission is unlikely to significantly degrade WiFi performance. The mode controller 6 then instructs the system to use Mode A which allows for a continuous transmission of the wakeup request and the use of the least frequent sniffing for a given required maximum latency. This will reduce the average current required for wakeup sniffing in the receptor. In this mode, the system can advantageously use one of the embodiments described with reference to FIGS. 7 to 9 to reduce overall power consumption at the receptor.

Suppose the instigator transmission monitor 7 then detects a consistently higher usage of WiFi as more users begin to use the network heavily (e.g. arrive at work). The mode controller 4 may then choose to use Mode B or C since these do not require lengthy continuous wakeup transmissions.

Mode B may be reasonable for moderate channel usage where the transmission timing can be more adequately controlled. In cases of high channel usage Mode C would be recommended since it is not as restrictive on transmission timing.

Transmission timing may be affected by listen-before-talk regulatory requirements which demand that the user listen for the channel to be free before beginning a wakeup transmission. Mode C will be more tolerant to reasonable delays in channel availability and so is recommended in higher usage situations.

Example 2

An example of the use of mode D would occur during the implantation of a medical device in a Hospital operating room. A medical device containing a receptor may initially be setup to operate in Mode A (or possibly B or C).

The device is woken up in preparation for implantation and then configured to operate in Mode D for a programmed period of time since during the implant operation while the device is being setup up the device should be very responsive to communication requests and more frequent sniffing is warranted. During the implant operation, response time may be more important than power savings. After the device has been successfully installed and setup, it may be returned to mode A (or possibly B or C) for the long-term.

These embodiments herein are particularly applicable to ultra-low power communication applications, which typically have milli- or micro-watt power consumption. However this is not meant to be limiting in any way. Embodiments of the invention allow high performance but high power communication protocols, such as Wi-Fi, to be used in low power applications. This will broaden the range of suitable applications for such protocols and the use of Internet connected Wi-Fi sensors. It also offers advantages in other protocols such as Zigbee.

Commercial applications may include, without limitation, any wireless network that (i) uses battery operated low power nodes, (ii) is predominately asleep and (iii) where communication sessions are required but the time of such sessions is unknown and (iv) each session requires a reasonable response time that is less than 100 seconds, and typically around 1 second for many applications.

Potential applications include, but are not limited to, medical (implant and external), security monitoring, locks and devices, industrial sensors and control applications.

The scope of the invention is not constrained by the configuration of nodes or the type of network (e.g. mesh, star etc).

It should be appreciated by those skilled in the art that any block diagrams herein represent conceptual views of illustrative circuitry embodying the principles of the invention. For example, a processor may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. The functional blocks illustrated herein may in practice be implemented in hardware or software.

The invention claimed is:

1. A method of establishing communication between a primary node and one or more secondary nodes over one or more communications channels, wherein the secondary nodes are placed in a sleep state in the absence of active communications and are responsive to a wake-up message transmitted over the one or more communications channels from the primary node to enter a wake-up state to permit the establishment of active communications, the method comprising:

sending a wake-up message from an instigator at the primary node to a receptor at a said secondary node;

periodically sniffing said one or more communications channels with the receptor at said secondary node for a valid wake-up message;

in response to reception of a valid wake-up message said receptor placing said secondary node in the wake-up state;

said instigator and receptor employing a selected one of a plurality of operational modes, said operational modes being defined by the timing of the wake-up message and sniff pattern at the receptor;

monitoring channel conditions in said one or more communication channels; and in response to said monitoring of said channel conditions changing said selected operational mode to suit different channel conditions, wherein said selected mode is changed at the receptor in response to a mode change instruction signal received from the instigator.

2. A method as claimed in claim 1, wherein the instigator monitors transmission conditions in said one or more communications channels, and changes the selected mode in response to a determination that the transmission conditions have changed by a certain amount.

3. A method as claimed in claim 1, wherein the receptor al monitors transmission conditions in said one or more channels, and changes the selected mode in response to a determination that the transmission conditions have changed by a certain amount.

4. A method as claimed in claim 1, wherein said receptor sends a wake-up response to said instigator in response to reception of a valid wake-up message.

5. A method as claimed in claim 4, wherein said wake-up message forms part of a group of repeated wake-up messages sent in a wake-up transmission to the receptor, at least some of said messages include an indication of the time until the end of the wake-up transmission, and after receiving a valid wake-up message said receptor enters a reduced power state until the end of the wake-up transmission before sending said wake-up response to the instigator and placing said secondary node in the wake-up state.

6. A method as claimed in claim 4, wherein said wake-up message forms part of a group of repeated wake-up messages sent in a wake-up transmission to the receptor, and after receiving a valid wake-up message said receptor sends said wake-up response to the instigator at a different channel from a channel at which the wake-up transmission was sent.

7. A method as claimed in claim 4, wherein said wake-up message forms part of a group of repeated wake-up messages sent in a wake-up transmission to the receptor, and after receiving a valid wake-up message said receptor enters a reduced power state while periodically sniffing for the end of the wake-up transmission, and wherein said receptor sends said wake-up response to said instigator upon detecting the end of the wake-up transmission.

8. A method as claimed claim 1, wherein said plurality of operational modes comprise at least two of the modes A, B, C, D defined by the following table:

| Mode | Instigator wake-up transmission request | Receptor Sniffing Mode |
|---|---|---|
| A | Continuous transmission | Periodic sniff with fixed interval |
| B | Periodic pattern with fixed duty cycle | Periodic sniff with fixed interval |
| C | Any pattern with fixed duty cycle limits (minimum on time and maximum off time) | Series of trains of sniffs at fixed intervals |
| D | Continuous with shorter transmission than mode A | Periodic sniff with shorter fixed interval than mode A. |

9. A method as claimed in claim 8, wherein in mode A the fixed interval is given by the expression: $Tsper=Twtx-Ts-Tr$, where Tsper is the time between sniffs, Twtx is the wake-up message transmission time, Ts is the sniff time, and Tr is wake-up message read time, wherein in mode B the fixed interval is given by an expression selected from the group consisting of: $Tsper1(n)=n\ (Toff+Ton)+Toff+Ts$ and $Tsper2(n)=n\ (Toff+Ton)+Ton-Ts$ where Tsper is the time between sniffs, Ts is the sniff time, Ton is wake-up message on time, Toff is the wake-up message off time, n is a positive integer selected for a desired latency, and wherein in mode C the period of sniffs in each train (Tsper2) is as follows:

$$Tsper2 \leq Min(Ton)-Ts$$

and the number of sniffs in each train (Nt) is:

$$Nt \geq Ceiling((Max(Toff)+Ts)/Tsper2)+1$$

And wherein the value of Nt satisfies the equation:

$$Tsper2=(Max(Toff+Ts)/(Nt-1)$$

where $$Nt=Ceiling((Max(Toff)+Ts)/(Min(Ton)-Ts))+1.$$

10. A method as claimed in claim 8, wherein said plurality of operational modes comprise all of said modes A,B,C,D.

11. A communications system as wherein communications are established between a primary node and one or more secondary nodes over one or more communications channels, wherein the secondary nodes are placed in a sleep state in the absence of active communications and are responsive to a wake-up message transmitted over the one or more communications channels from the primary node to enter a wake-up state to permit the establishment of active communications, the system comprising:

an instigator for transmitting on demand a wake-up message over one or more communication channels; and a receptor configured to periodically sniff said one or more communications channels at said secondary node for a valid wake-up message, said receptor comprising:

a wake-up signal generator for generating a wake-up signal to place the secondary node in the wake-up state in response to reception of a valid wake-up message;

a transmission monitor for monitoring channel conditions in said one or more communication channels; and a controller configured to employ a selected one of a plurality of operational modes, said operational modes being defined by the timing of the wake-up message and sniff pattern at the receptor, said controller further responsive to an output from said transmission monitor to change said selected operational mode at the receptor to suit different channel conditions, wherein said receptor is configured to send a wake-up response to said instigator in response to reception of a valid wake-up message, and said instigator is configured to transmit said wake-up message as part of a group of repeated wake-up messages sent in a wake-up transmission to the receptor, and to include an indication of the time until the end of the wake-up transmission in at least some of said wake-up messages, and said receptor is configured to:

(i) enter a reduced power state until the end of the wake-up transmission (ii) to send said wake-up response to the instigator and place said secondary node in the wake-up state at the end of the wake-up transmission after receiving a valid wake-up message.

12. A system as claimed in claim 11, wherein said controller is configured to change the selected mode in response to a mode change signal received from the instigator.

13. A system as claimed in claim 11, wherein the instigator includes said transmission monitor configured to monitor channel conditions in said one or more channels, and said instigator being configured to send a mode change signal to said controller in response to a determination that the channel conditions have changed by a certain amount.

14. A system as claimed in claim 11, wherein the receptor includes said transmission monitor configured to monitor transmission conditions in said one or more channels.

15. A system as claimed in claim 11, wherein said receptor is configured to send a wake-up response to said instigator in response to reception of a valid wake-up message and said instigator is configured to transmit said wake-up message as part of a group of repeated wake-up messages sent in a wake-up transmission to the receptor, and said receptor is configured to send said wake-up response to the instigator on a different channel from a channel on which the wake-up transmission was sent.

16. A system as claimed in claim 11, wherein said receptor is configured to send a wake-up response to said instigator in response to reception of a valid wake-up message and said instigator is configured to transmit said wake-up message as part of a group of repeated wake-up messages sent in a wake-up transmission to the receptor, and said receptor is configured to enter a reduced power state upon receipt of a valid wake-up message while periodically sniffing for the end of the wake-up transmission, and wherein said receptor is configured to send said wake-up response to said instigator upon detecting the end of the wake-up transmission.

17. A system in claim 11, wherein said plurality of operational modes comprise at least two of the modes A, B, C, D defined by the following table:

| Mode | Instigator wake-up transmission request | Receptor Sniffing Mode |
| --- | --- | --- |
| A | Continuous transmission | Periodic sniff with fixed interval |
| B | Periodic pattern with fixed duty cycle | Periodic sniff with fixed interval |
| C | Any pattern with fixed duty cycle limits (minimum on time and maximum off time) | Series of trains of sniffs at fixed intervals |
| D | Continuous with shorter transmission than mode A | Periodic sniff with shorter fixed interval than mode A. |

18. A system as claimed in claim 17, wherein in mode A the fixed interval is given by the expression: Tsper=Twtx−Ts−Tr, where Tsper is the time between sniffs, Txtx is the wake-up message transmission time, Ts is the sniff time, and Tr is wake-up message read time, wherein in mode B the fixed interval is given by an expression selected from the group consisting of: Tsper1(n)=n (Toff+Ton)+Toff+Ts and Tsper2(n)=n (Toff+Ton)+Ton−Ts where Tsper is the time between sniffs, Ts is the sniff time, Ton is wake-up message on time, Toff is the wake-up message off time, n is a positive integer selected for a desired latency, and wherein in mode C the period of sniffs in each train (Tsper2) is as follows:

$$Tsper2 \leq Min(Ton) - Ts$$

and the number of sniffs in each train (Nt) is:

$$Nt \geq Ceiling((Max(Toff) + Ts)/Tsper2) + 1.$$

19. A system as claimed in claim 17, wherein said plurality of operational modes comprise all of said modes A, B, C, D.

20. A receptor for use in a communication system wherein communications are established between a primary node and one or more secondary nodes over one or more communications channels, wherein the secondary nodes are placed in a sleep state in the absence of active communications and are responsive to a wake-up message transmitted over the one or more communications channels from the primary node to enter a wake-up state to permit the establishment of active communications, the receptor comprising:

a receiver for receiving a wake-up message from an instigator at the primary node;

a controller for periodically activating the receiver to sniff said one or more communications channels with the receptor to listen for a wake-up message;

in response to reception of a valid wake-up message said receptor placing said secondary node in the wake-up state;

said controller employing a selected one of a plurality of operational modes, said operational modes being defined by the timing of the wake-up message and sniff pattern at the receptor, and said controller being configured to change said selected operational mode to suit different channel conditions; and wherein said controller is configured to change the selected mode based on a condition selected from the group consisting of: a change signal received from the instigator and a programmed schedule.

21. A receptor as claimed in claim 20, wherein said plurality of operational modes comprise at least two of the modes A, B, C, D defined by the following table:

| Mode | Instigator wake-up transmission request | Receptor Sniffing Mode |
| --- | --- | --- |
| A | Continuous transmission | Periodic sniff with fixed interval |
| B | Periodic pattern with fixed duty cycle | Periodic sniff with fixed interval |
| C | Any pattern with fixed duty cycle limits (minimum on time and maximum off time) | Series of trains of sniffs at fixed intervals |
| D | Continuous with shorter transmission than mode A | Periodic sniff with shorter fixed interval than mode A. |

22. A receptor as claimed in claim 20, wherein in mode A the fixed interval is given by the expression: Tsper=Twtx−Ts−Tr, where Tsper is the time between sniffs, Txtx is the wake-up message transmission time, Ts is the sniff time, and Tr is wake-up message read time, wherein in mode B the fixed interval is given by an expression selected from the group consisting of: $Tsper1(n)=n(Toff+Ton)+Toff+Ts$ and $Tsper2(n)=n(Toff+Ton)+Ton-Ts$ where Tsper is the time between sniffs, Ts is the sniff time, Ton is wake-up message on time, Toff is the wake-up message off time, n is a positive integer selected for a desired latency, and wherein in mode C the period of sniffs in each train (Tsper2) is as follows:

$$Tsper2 \leq Min(Ton)-Ts$$

and the number of sniffs in each train (Nt) is:

$$Nt \geq Ceiling((Max(Toff)+Ts)/Tsper2)+1.$$

* * * * *